United States Patent [19]
Engle

[11] 3,987,689
[45] Oct. 26, 1976

[54] SPEED-SENSITIVE DIFFERENTIAL MECHANISM

[75] Inventor: James L. Engle, Muncie, Ind.

[73] Assignee: Borg-Warner Corporation, Chicago, Ill.

[22] Filed: Dec. 23, 1974

[21] Appl. No.: 535,595

[52] U.S. Cl. .............................................. 74/711
[51] Int. Cl.² ...................................... F16H 1/44
[58] Field of Search ...................... 74/711, 710.5; 180/24.09, 44 F; 192/57 E, 85 AA

[56] References Cited
UNITED STATES PATENTS

| | | | |
|---|---|---|---|
| 2,004,929 | 6/1935 | Centervall | 74/710.5 X |
| 2,026,777 | 1/1936 | Dumble | 192/57 X |
| 2,913,928 | 11/1959 | Double | 74/710.5 |
| 3,229,550 | 1/1966 | Nickell | 74/711 |
| 3,230,795 | 1/1966 | Mueller | 74/711 |
| 3,361,008 | 1/1968 | Fallon | 74/711 |
| 3,393,582 | 7/1968 | Mueller | 74/711 |
| 3,724,289 | 4/1973 | Kennicutt | 74/711 |

Primary Examiner—Samuel Scott
Assistant Examiner—Lance W. Chandler
Attorney, Agent, or Firm—Robert L. Zieg

[57] ABSTRACT

A limited slip differential mechanism for the speed-sensitive type having a rotatable casing and gearing supported within the casing adapted to drive a pair of relatively rotatable output elements including friction clutches associated with the gearing and the casing to resist relative rotation. The limited slip differential includes an actuator for the clutches, the actuator being associated with the fluid pump mechanism and having a cam thereon operative to reciprocate radial pistons to create fluid pressure. The actuator is connected with one of the output elements for the differential mechanism and the radial pistons are carried by the casing whereby relative rotation between the casing and the output element will create fluid pressure to activate the actuator and apply the clutches to resist relative rotation.

7 Claims, 5 Drawing Figures

SPEED-SENSITIVE DIFFERENTIAL MECHANISM

BACKGROUND OF THE INVENTION

Prior art devices relating to limited slip differential mechanisms of the speed-sensitive type are well known. In particular, it is known to provide a fluid pump structure within the differential mechanism which will operate in a speed-sensitive manner to resist relative rotation. Many of the known prior art devices incorporate pumping structures and a means to block the output of the pump in response to speed difference which tends to resist relative differential action. These devices have proved unsatisfactory in that the relative rotation does not seem to provide sufficient pumping action such that the blocking of the outlet is effective to retard differential action except in cases of extremely high speed difference. Further prior art devices are known having speed-sensitive fluid pump mechanisms, but each of these devices tend to have relatively complicated structures which are expensive to manufacture and take up substantial space within the differential mechanism to add the speed-sensitive feature.

SUMMARY OF THE INVENTION

The present invention solves the problems above discussed in connection with prior art devices in that an extremely simple structure provides the speed-sensitive function for a limited slip differential, while at the same time requiring a minimum of structural modification. A fluid pump structure is provided wherein the actuator for the friction clutches in addition to serving as the actuator for the clutch, is one of the elements of the pump mechanism adapted to reciprocate the pumping elements to create fluid pressure. In addition, the pump is of the radial piston type which is well adapted to a differential environment in that the differential casing is cylindrical and thereby provides an inherently proper structure to serve as the cylinder block for radial pumping elements. By locating the pumping elements in proximity to the location of the friction clutch actuator, the pumping cam may be integral with the actuator itself to activate the radial pistons to create the pumping action. Also by placing the radial pistons within the casing, since the interior of the casing is filled with the differential lubricating fluid, ready access to fluid in the differential is provided by passages within the casing.

DESCRIPTION OF THE PREFERRED EMBODIMENT

Figure 1:
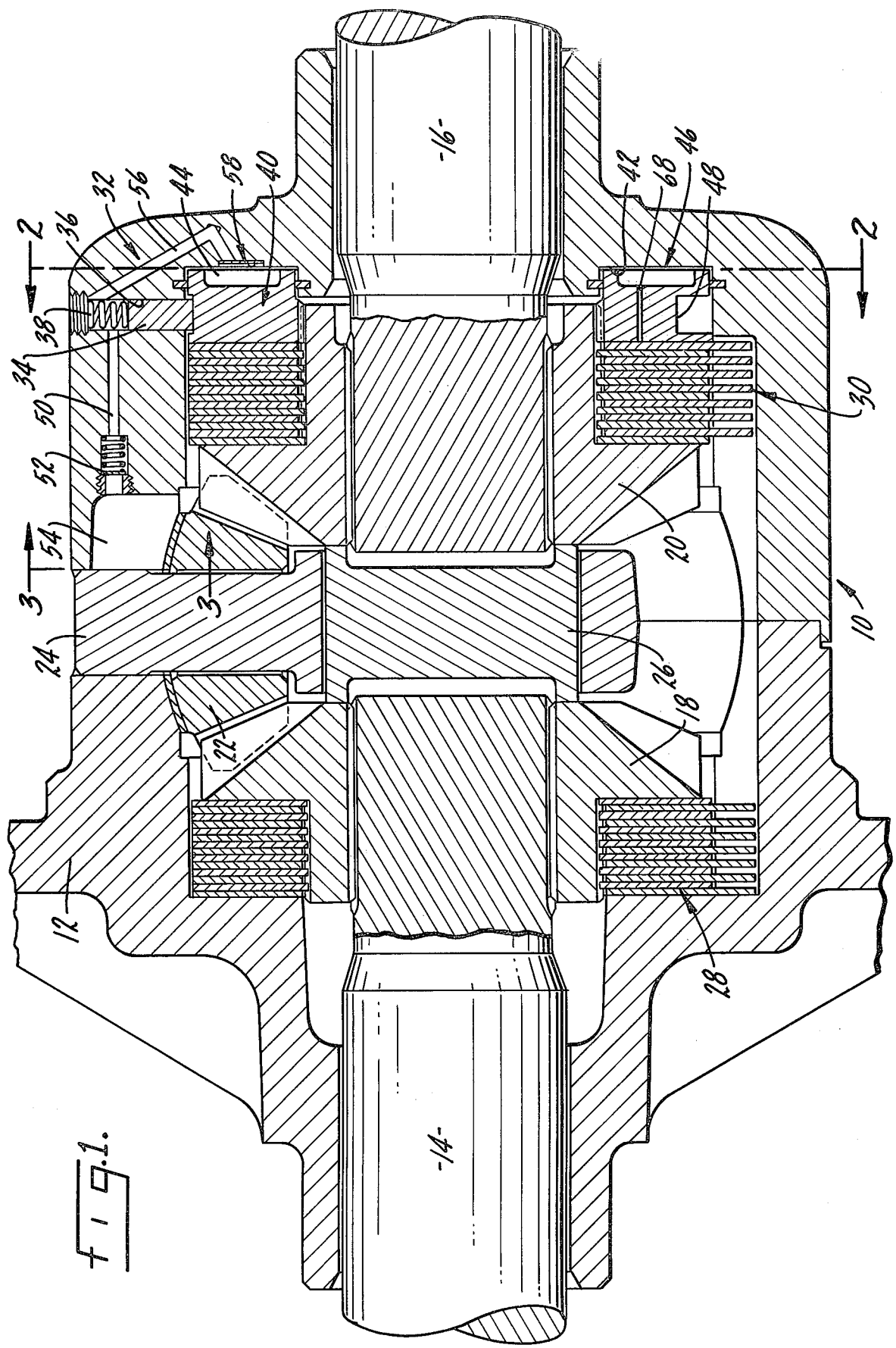
FIG. 1 is a cross-sectional view of a limited slip differential embodying the principles of the invention.
Figure 2:
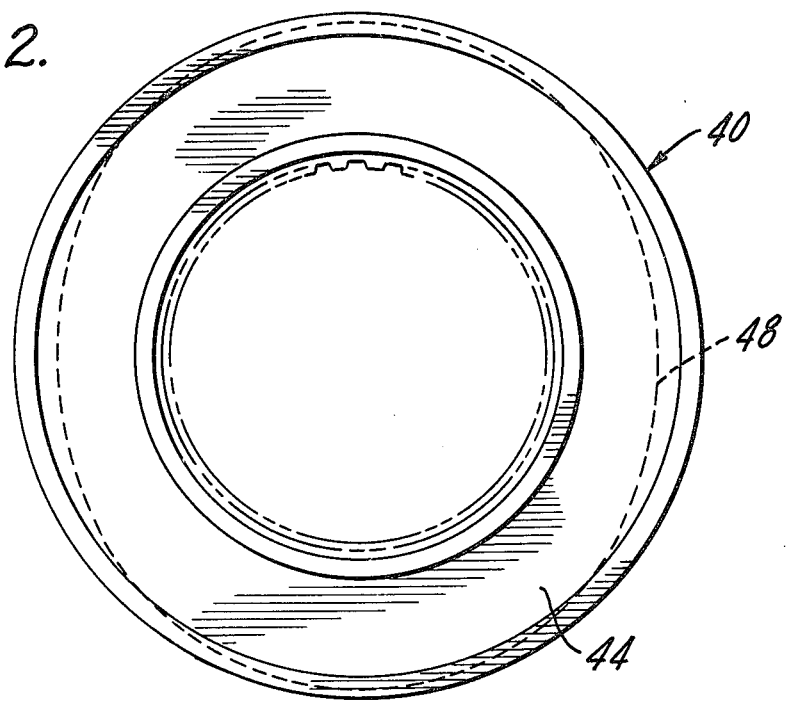
FIG. 2 is a view taken along the lines 2—2 of FIG. 1.
Figure 3:
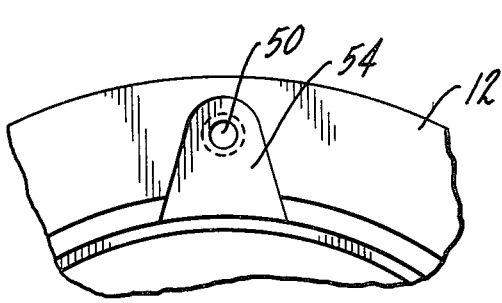
FIG. 3 is a view taken along the lines 3—3 of FIG. 1.

Referring to FIG. 1 there is illustrated a speed-sensitive limited slip differential mechanism 10 which comprises a casing 12 adapted to drive a pair of output shafts or elements 14 and 16. Contained within the casing 12 is a planetary gearing system comprising side gears 18 and 20 splined to the output shaft 14 and 16 respectively. Meshing with the side gears 18 and 20 is a plurality of planetary pinion gears 22 carried by a mounting or cross pin 24 mounted in the casing 12. A bearing block 26 is provided between the side gears 18 and 20 adapted to transmit thrust between side gears as will be described.

A pair of clutch mechanisms 28 and 30 are provided having alternate discs splined to side gears 18 and 20 and casing 12, respectively, which when engaged resist differential action.

The differential mechanism 10 may be incorporated as a normal differential installation for the driving axles of a two-wheel drive vehicle or in addition may be adapted for use in a four-wheel drive mechanism such as shown in U.S. Pat. Nos. 3,650,349 and 3,656,573 of common assignee wherein a differential is utilized to transmit torque to front and rear driving axles, respectively.

The differential of the present invention is a speed-sensitive differential in that in response to speed difference, friction clutches are applied to resist relative rotation or differential action between the casing and side gear. The speed sensitive apparatus including in the present invention comprises a fluid pump or fluid energy generating means 32 mounted within the casing. The fluid pumping means 32 includes a plurality of radial pistons 34 mounted in radial bores 36 in the casing 12. A spring 38 is provided for each of the pistons 34 urging the pistons inwardly. The clutches 28 and 30 may be activated by an annular actuator 40 mounted in a bore 42 in the casing 12. Actuator 40 has a recess 44 therein. Actuator 40, recess 44 and bore 42 together define a fluid chamber 46 in the casing 12. As will be seen when the actuator 40 is moved to the left by fluid pressure, it will engage the clutch discs in the clutch 28 and 30 to resist differential action.

Provided on the actuator 40 is a cam 48 which the pistons 34 engage due to the action of the springs 38. The annular actuator 40 is splined on the inner diameter to rotate with the side gear 20. Since the radial pistons 34 are carried by the casing 12, and the actuator 40 is carried by the side gear 20, it will be apparent that when relative rotation exists between side gear 20 and casing 12 a pumping action will take place due to relative rotation between actuator 40 and radial pistons 34 whereby the cam 48 reciprocates pistons 34 to create fluid pressure.

The casing 12 includes an inlet passage 50 which is connected by means of a check valve 52 to a fluid reservoir 54 in the interior of casing 12. A fluid pressure passage 56 is also provided in the casing 12 which supplies fluid pressure created by the fluid pump to chamber 46. A reed type check valve 58 is included mounted in casing 12 which allows fluid pressure to flow from fluid passage 56 to chamber 46, but will not permit fluid to flow back from the chamber to the passage 56.

Figure 5:
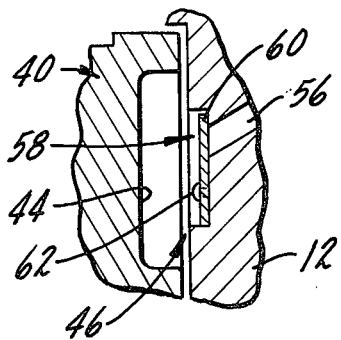
FIG. 5 is an enlarged view of a portion of the differential casing having a one-way valve therein.

Referring to FIG. 5, the check valve 56 is shown in detail, and comprises a flexible reed 60 secured to casing 12 by a screw or rivet 62 so that when no pressure exists in passage 56 or when the pressure in chamber 46 is higher than that in passage 56, the reed 60 will close over passage 56 and prevent flow of fluid from chamber 46 into passage 56.

Figure 4:
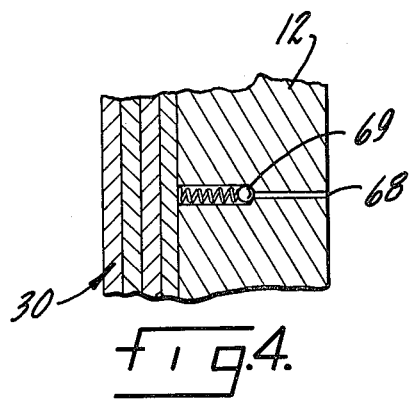
FIG. 4 is a partial section of the clutch actuator.

Referring again to FIG. 1, a restricted passage 68 is provided which will allow restricted release of fluid pressure from chamber 46 according to orifice principles. A modified form of restricted passage 68 is illustrated in FIG. 4 wherein a spring loaded valve 69 is provided which prevents flow of fluid through the retricted passage 68 until a predetermined pressure is reached.

Although only a single radial piston 34 is illustrated in the drawing it is contemplated that a plurality of radial pistons, two or more, may be used, spaced around the circumference of actuator 40 to provide either a steady or a pulsating pressure as may be desired, to provide an effective limited-slip action. A reservoir 54, inlet passage 50 and fluid pressure passage 56 is to be provided for each radial piston 34. As will be apparent a single reservoir could be sized to handle more than one piston.

The operation of the device then is that when relative rotation takes place between side gear 20 and casing 12. Actuator 40 will be rotated relative to the casing 12 whereby pistons 34 will be moved upwardly as illustrated in FIG. 1, closing check valve 52 in inlet passage 50 and pumping fluid into the output fluid pressure passage 56. Relative rotation will take place between side gear 20 and casing 12 during differential action when the side gears and their respective output shafts are rotating at differential speeds. Therefore, as will be apparent, the present differential design is a speed-sensitive differential in that it provides a limited slip function by applying friction clutch means in response to speed difference. Such activation of a limited slip differential is desirable in any installation where a limited slip function is desired, to be sure that a portion of the torque is always supplied to one of the axles with driving traction, but is particularly suited for four-wheel drive mechanisms wherein the activation of the limited slip function has been found to be most suitable when it is related to a speed difference between the front and rear wheel drive shafts and thus the output elements of the differential mechanism.

When the differential 10 is used in a normal two-wheel drive installation, the output shafts 14 and 16 being each connected to drive a wheel, during normal turning movements of the vehicle a small difference in wheel speeds will occur causing relative rotation of the side gears and pinion gears with respect to one another and to the casing 12. Under such circumstances the relative rotational speeds are comparatively low and little, if any effect will be noted on the actuator 40 and clutches 28 and 30. Thus, in such circumstances, torque will be delivered approximately equally to the two drive wheels.

When, however, a condition arises where one of the drive wheels loses traction, so that it slips and is accelerated to a substantially higher rotational speed than the other drive wheel, the relative rotation of side gear 20 with respect to the casing 12 will cause sufficient hydraulic pressure to be developed to act on actuator 40 to cause engagement of clutches 28 and 30 such as to retard differential action.

As will be apparent from the above description and drawings, the present speed-sensitive limited slip differential is an improvement over previous differentials utilizing a fluid energy generating means as the speed-sensitive device in that the actuator for the friction clutch is both a clutch actuator and an integral part of the pumping device in that the pumping cam for the radial piston pump is formed on the actuator itself.

In addition to the above advantages, it will be apparent that the speed-sensitive function has been added to a limited slip differential with very slight structural modification.

The various features of the invention have been particularly shown and described, however, it should be obvious to one skilled in the art that modifications may be made therein without departing from the scope of the invention.

I claim:
1. A limited slip differential comprising a casing adapted to be rotatably driven, gearing rotatably supported in said casing and adapted for connection with a pair of relatively rotatable output elements, a friction clutch associated with said gearing and said casing and actuable to frictionally resist relative rotation of said output elements, clutch actuator for said friction clutch connected to rotate with one of said output elements and adapted to be moved by fluid pressure, a source of fluid pressure comprising a fluid pump including pumping members and driving member, one of said members being carried by said casing and the other of said members being integral with said clutch actuator, whereby upon relative rotation between said one output element and said casing said pump will supply pressure which acts on said actuator to actuate said friction clutch.

2. A limited slip differential as claimed in claim 1 wherein said pumping members comprise a plurality of pistons and said driving member comprises a cam in engagement with said pumping members.

3. A limited slip differential as claimed in claim 2 wherein said plurality of pumping members are carried by said casing and said clutch actuator has said cam integral therewith.

4. A limited slip differential as claimed in claim 1 wherein said pump is of the radial piston type, said casing carrying a plurality of radial pistons and said actuator having integral therewith a cam means in engagement with said pistons.

5. A limited slip differential comprising a casing adapted to be rotatably driven, gearing rotatably supported in said casing and adapted for connection with a pair of relatively rotatable output elements, a friction clutch associated with said gearing and said casing and actuable to frictionally resist relative rotation of said output elements, an actuator for said friction clutch drivingly connected to one of said output members adapted to be moved by fluid pressure, a source of fluid pressure comprising a fluid pump including a plurality of radially disposed piston members mounted in said casing and a cam in contact with said pistons, said cam being integral with said actuator whereby upon relative rotation between said one output element and said casing said pump will supply pressure which acts on said actuator to actuate said friction clutch to retard relative rotation of said output element and said casing.

6. A limited slip differential as claimed in claim 5 wherein said actuator is annular in shape having a cylindrical peripheral surface and said cam being formed in said surface.

7. A limited slip differential as claimed in claim 6 wherein passage means are provided in said casing connecting the interior of said casing with said fluid pump to supply fluid thereto and a fluid reservoir in said casing adjacent said passage means to collect fluid in said casing.

* * * * *